United States Patent [19]
Nishi

[11] Patent Number: 5,386,539
[45] Date of Patent: Jan. 31, 1995

[54] IC MEMORY CARD COMPRISING AN EEPROM WITH DATA AND ADDRESS BUFFERING FOR CONTROLLING THE WRITING/READING OF DATA TO EEPROM

[75] Inventor: Seiki Nishi, Tokyo, Japan

[73] Assignee: Fuji Photo Film Co., Ltd., Kanagawa, Japan

[21] Appl. No.: 751,982

[22] Filed: Aug. 29, 1991

[30] Foreign Application Priority Data

Sep. 28, 1990 [JP] Japan .................. 2-257376

[51] Int. Cl.$^6$ .................. G06F 12/06; G06F 13/00
[52] U.S. Cl. .................. 395/425; 235/492;
364/DIG. 1; 364/254.4; 364/927.97;
364/933.2; 364/933.3; 364/957.2; 364/965.76;
348/233
[58] Field of Search .................. 340/439; 358/17;
395/550, 500, 495; 364/565, 965.76; 382/49;
365/94, 52; 235/492

[56] References Cited

U.S. PATENT DOCUMENTS

| 3,790,961 | 2/1974 | Palfi et al. ................ 365/222 |
| 4,217,637 | 8/1980 | Faulkner et al. ........... 395/550 |
| 4,573,141 | 2/1986 | Simon ....................... 395/500 |
| 4,644,368 | 2/1987 | Mutz ......................... 340/439 |
| 4,733,294 | 3/1988 | Wesolowski ............... 358/17 |
| 4,794,551 | 12/1988 | Yoshida ..................... 364/565 |
| 4,811,303 | 3/1989 | Hirai .......................... 365/94 |
| 4,860,375 | 8/1989 | McCubbrey et al. ..... 382/49 |
| 4,864,542 | 8/1989 | Oshima et al. ............. 365/189.01 |
| 4,896,262 | 1/1990 | Wayama et al. ........... 395/500 |
| 4,979,144 | 12/1990 | Mizuta ....................... 395/425 |
| 5,016,107 | 5/1991 | Sasson et al. .............. 358/209 |
| 5,025,415 | 6/1991 | Masuyama et al. ........ 365/52 |
| 5,040,068 | 8/1991 | Parulski et al. ............ 358/209 |
| 5,121,492 | 6/1992 | Saville, III et al. ......... 395/500 |
| 5,166,503 | 11/1992 | Mizuta ....................... 235/492 |
| 5,267,218 | 11/1993 | Elbert ......................... 365/226 |
| 5,276,843 | 1/1994 | Tillinghast et al. ........ 395/425 |

OTHER PUBLICATIONS

IC Memory Card Guidlines from "Japan Electronic Industry Development Association Personal Computer Operation Committee", pp. 1, 8 & 9, and 48-51, Jun. 1990.
TC58F1001P/F-15,-20 published Feb. 1991; pp. 395-429.
HN29C101 "131072 Word×8-Bit CMOS Memory" published Sep. 1991; pp. 857-881.
TC58F1000P/F/J-15,-20 published Feb. 1990; pp. 412-445.

Primary Examiner—Joseph L. Dixon
Assistant Examiner—Frank J. Asta

[57] ABSTRACT

An IC memory card connectable to a host has a storage implemented as an EEPROM, and a control circuit for controlling the storage to write data transferred from the host to the memory card in the storage. The control circuit has latches for temporarily holding input data and an address representative of a particular storage location of the storage for storing the data which are transferred from the host, a clock input terminal for receiving from the host a first clock for causing the latches to hold the data, and a clock generator for generating a second clock for writing the data in the storage.

12 Claims, 2 Drawing Sheets

IC MEMORY CARD COMPRISING AN EEPROM WITH DATA AND ADDRESS BUFFERING FOR CONTROLLING THE WRITING/READING OF DATA TO EEPROM

BACKGROUND OF THE INVENTION

1. Field of the Invention

The present invention relates to an IC (Integrated Circuit) memory card and, more particularly, to an IC memory card having an EEPROM (Electrically Erasable Programmable Read Only Memory).

2. Description of the Related Art

An IC memory card is used with, for example, a digital electronic still camera for the purpose of storing picture data representative of scenes picked up by the camera. While an IC memory card for such an application is often implemented by an SRAM (Static Random Access Memory), an EEPROM is advantageous over an SRAM from the cost standpoint. It is desirable, therefore, that an SRAM and an EEPROM be compatible with each other in respect of the interface to a digital electronic still camera.

Japan Electronics Industry Development Association (JEIDA), for example, has recently proposed an Memory Guideline. In the third edition of this Guideline, JEIDA defines a connector having twenty pins. A memory card with an SRAM has eight terminals to input and output data over an 8-bit parallel transfer bus. The eight terminals are used not only to read and write data in the memory chip of the memory card but also to convey the addresses of the memory locations. Therefore, such a memory card has two extra terminals for distinguishing data and addresses, i.e., the distinction is made on the basis of the logical states of the extra terminals. Specifically, when the address of a memory location is constituted by a plurality of bytes, one of the bytes is designated by the combination of the logical states of the two extra terminals.

The memory card with an SRAM has a control circuit therein for controlling the write-in and read-out of the memory chip. On receiving the bytes of an address, the control circuit sets up the address of the memory chip. Thereafter, the control circuit sequentially increments the address of the memory chip in response to a data clock being applied to a clock terminal, thereby reading or writing data in the memory chip. In this manner, the memory card with an SRAM is constructed such that addresses and data fed from an apparatus in which the card is loaded, i.e., a host are written to the memory chip in response to clock pulses also fed from the host.

An IC memory card implemented with an EEPROM would be complicated in respect of data writing operations, compared to the above-stated SRAM type memory card. Assuming model TC58F1OOOP/F/J which is a 1-megabit EEPROM available from Toshiba, Japan, by way of example, it is necessary to input a write command before an address and to input a verify command after data for verification. Specifically, this particular EEPROM has data input/output terminals independent of address input terminals. To write data in the EEPROM, a command for setting up a write mode is applied to the address terminals and data terminals in the period of three clock pulses. In the subsequent clock period, an address and one byte of data are applied to the address terminals and the data terminals, respectively. Thereafter, a verify mode set-up command is inputted to the address terminals and data terminals in the period of three clock pulses in order to set up a verify mode. In the following clock period, the one byte of data is read out for verification. With an EEPROM type IC memory card, therefore, it is impossible to write data therein by inputting the data together with an address in synchronism with a clock, which results in the need for a complicated sequence.

As stated above, a conventional IC memory card with an EEPROM is not compatible with a memory card implemented with an SRAM. Therefore, when an apparatus operable with both of an SRAM type memory card and an EEPROM type memory card is desired, it was a common practice to provide the apparatus with extra functions capable of executing an exclusive sequence for an EEPROM card. This complicated the construction of the apparatus and thereby obstructed the reduction in the size and cost of the apparatus.

SUMMARY OF THE INVENTION

It is therefore an object of the present invention to provide an IC memory card having an EEPROM which is compatible with an IC memory card having an SRAM.

In accordance with an embodiment of the present invention, an IC memory card connectable to a host has a storage implemented as an EEPROM, and a control circuit for controlling the storage to write data transferred from the host to the memory card in the storage. The control circuit has latches for temporarily holding input data and an address representative of a particular storage location of the storage for storing the data which are transferred from the host, a clock input terminal for receiving from the host a first clock for causing the latches to hold the data, and a clock generating section for generating a second clock for writing the data in the storage.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
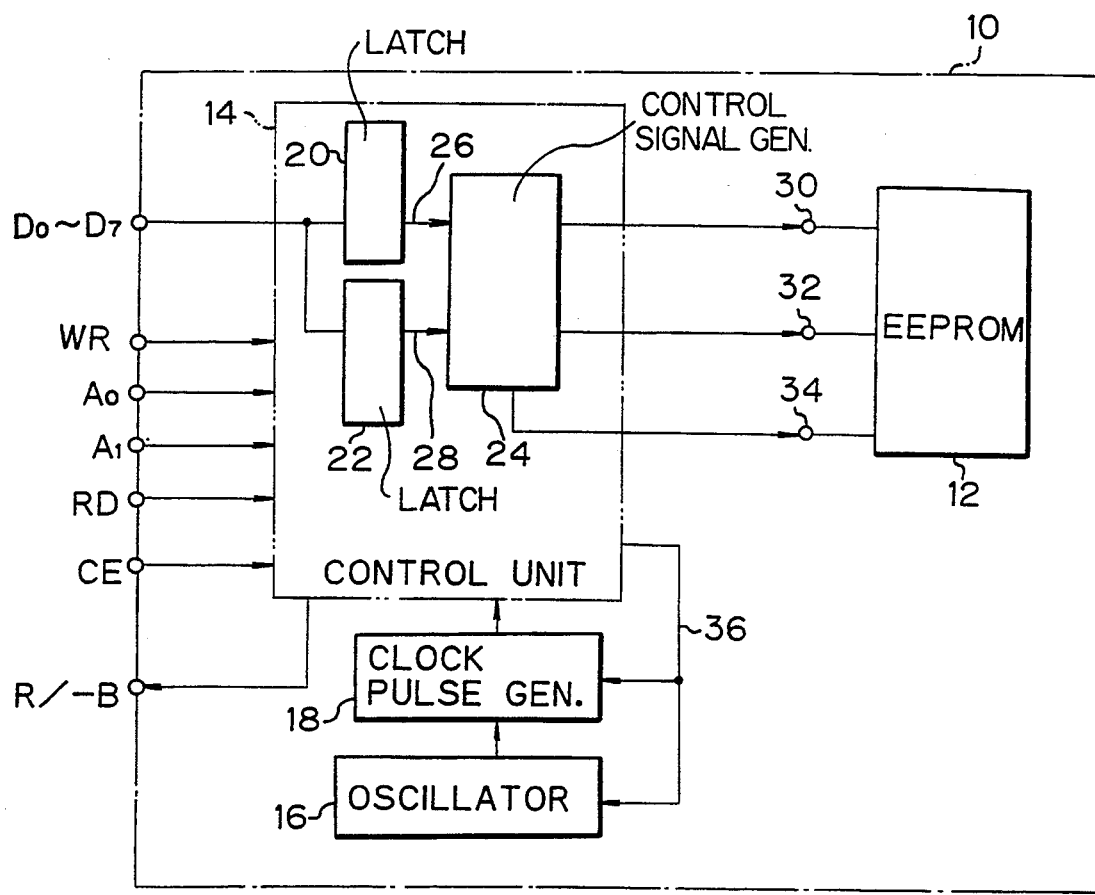
FIG. 1 is a block diagram schematically showing a preferred embodiment of an IC memory card with an EEPROM in accordance with the present invention.

In FIG. 1 of the drawings, an IC memory card with an EEPROM embodying the present invention is shown and generally designated by the reference numeral 10. In the illustrative embodiment, the memory card 10 has an I/O (Input/Output) bus interface having twenty Dins, as proposed in the JEIDA IC Memory Card Guideline, Third Edition. As shown, the memory card 10 includes an EEPROM 12 having an address space or storage locations which can be designated by a 24-bit address.

The I/O bus interface of the memory card 10 has terminals D0–D7, WR, A0, A1, RD, CE, and R/−B which will be described specifically later. These terminals are connectable to a host processor, not shown, such as a digital electronic still camera or a personal computer. When the host transfers data to the memory card 10. The memory card 10 holds the data and an address in latches 22 and 20, respectively, in response to a clock which is also fed from the host. Afterwards, the memory card 10 executes a sequence of steps for writing the data in the EEPROM 12 in response to clock pulses which are generated within the memory card 10 by an oscillator 16.

An address signal and a data signal from the host are applied to the 8-bit input/output terminals D0-D7. The terminal WR is a clock input terminal for writing data in the memory card 10. The terminals A0 and A1 play the role of address input ports for selecting input/output ports provided in the memory card 10. In the illustrative embodiment, the access to the effective address space of the EEPROM 12 is effected by an address having three bytes. i.e., twenty-four bits in total. One of the three bytes. i.e., upper, intermediate and lower bytes of an address is designated by a particular combination of logical states of the ports A0 and A1. In the illustrative embodiment, when both of the ports A0 and A1 are in a low level or "L", they indicate that data to arrive at the terminals D0-D7 is the lower byte of an address. When the ports A0 and A1 are respectively in a high level or "H" and a low level, they indicate that the intermediate byte of an address will arrive at the terminals D0-D7. When the ports A0 and A1 are respectively in a low level and a high level, they show that the lower byte of an address will arrive at the terminals D0-D7. Further, when both of the ports A0 and A1 are in a high level, they indicate that data to be written to the EEPROM 12 will arrive at the terminals D0-D7.

The terminal RD is a clock input terminal for reading data out of the memory card 10. The terminal CE is a chip enable terminal which will be brought to a high level when the host accesses the memory card 10. The terminal R/−B serves as a ready-to-write indication port for indicating whether or not the memory card is ready to receive data at the input terminals D0-D7 when in a write mode. Specifically, when the terminal R/−B is in a low level, the transfer of data from the host to the memory card 10 is inhibited. While the memory card 10 has other terminals such as a power source terminal, a ground terminal and a write inhibit terminal in addition to the terminals shown and described, they will not be shown or described specifically since they do not constitute any essential part of the present inventon.

The IC memory card 10 basically has a control circuit 14, the oscillator 16, and a clock pulse generating circuit 18 in addition to the EEPROM 12. The control circuit 14 has the previously mentioned two latches 20 and 22 and a control signal generating circuit 24 so as to control the write-in and read-out of data from the EEPROM 12. The oscillator 16 generates a reference clock for causing data to be written in and read out of the EEPROM 12. The clock pulse generating circuit 18 generates a clock for the synchronous operations of the control circuit 14 by dividing the frequency of the reference clock.

The latch 20 of the controller 14 is connected to the input terminals D0-D7 to latch each of the upper, intermediate and lower bytes of an address. The other latch 22, also connected to the input terminals D0-D7, latches one byte of data applied to the terminals D0-D7. The latches 20 and 22 have respectively an address output 26 and a data output 28 which are connected to the control signal generating circuit 24.

In response to clock pulses generated by the clock pulse generating circuit 18, the control signal generating circuit 24 generates signals such as commands and addresses necessary for data to be written in or read out of the EEPROM 12, thereby managing a writing and a reading sequence. Such signals from the control signal generating circuit 24 appear on an address terminal 30, a data terminal 32, and a write enable terminal 34. Besides, the control signal generating circuit 24 has circuit elements essential in reading data out of the EEPROM 12, although not shown or described specifically. Such circuit elements including those not shown or described are loaded on a flat card-like support to constitute a single memory card 10.

In operation, when the memory card 10 is ready to write data in the EEPROM 12 thereof, the control circuit 14 brings the terminal R/−B to a high level to inform the host of the ready-to-write condition of the memory card 10. In response, the host causes the chip enable terminal CE of high level while feeding a write clock to the terminal WR. At the same time, the host applies three bytes of an address to the terminals D0-D7 serially in order to designate a particular location in the memory space of the EEPROM 12. One of the three bytes. i.e., the upper, intermediate and lower bytes is specified by the logical states of the ports A0 and A1, as stated earlier. Subsequently, the host changes the logical states of both of the ports A0 and A1 to a high level and then delivers one byte of data and a write clock to the terminals D0-D7 and the terminal WR, respectively. The latches 20 and 22 latch the 3-byte address and 1-byte data, respectively.

On detecting the entry of data in the memory card 10, the control circuit 14 brings the terminal R/−B to a low level. This prevents the host from transferring the next data to the memory card 10 until the preceding data has been fully written to the EEPROM 12. Further, the control circuit 14 renders the oscillator 16 and the clock pulse generating circuit 18 operable over a control line 36. In response, the oscillator 16 and the clock pulse generating circuit 18 cooperate to feed a clock necessary for the control circuit 14 to write data in the EEPROM 12 to the control circuit 14. The control circuit in turn delivers signals for writing data in the EEPROM 12 to the address terminal 30, data terminal 32, and write enable terminal 34.

Data having been latched in the latch 22 is written to the EEPROM 12 on the basis of the address having been held in the latch 20 in the following fashion. To begin with, the control signal generating circuit 24 delivers a command for setting up a write mode to the address terminal 30 and data terminal 32 in the period of three clock pulses generated by the clock pulse generating circuit 18. In the next clock period, the control signal generating circuit 24 feeds the address and the one byte of data to the input address and data 30 and 32, respectively, while activating the write enable terminal 34.

Subsequently, to verify the write-in of the data, the control circuit 14 applies a verify mode set-up command to the address terminal 30 and data terminal 32 in the period of three clock pulses for setting up a verify mode. In the next clock period, the control circuit 14 executes a sequence of steps for reading the one byte of data out of the EEPROM and verifying the one byte of data.

On fully writing the data in the EEPROM 12, the control circuit changes the logical state of the terminal R/−B to a high level to inform the host of the end of writing. In response, the host applies another one byte of data to the terminals D0–D7. The control signal generating circuit 24 increments an address counter, not shown, built therein with the result that the data applied to the terminals D0–D7 is written to the next address of the EEPROM 12. Such an operation is repeated to write data sequentially fed from the host to the memory card 10 in the EEPROM 12. As the host transfers all the desired data to the memory card 10, the host causes the terminal CE of the memory card 10 to go low so as to notify the memory card 10 of the end data. In response to the low-level signal CE, the control circuit 14 deactivates the oscillator 16 and the clock generating circuit 18 via the control line 36.

Figure 2:
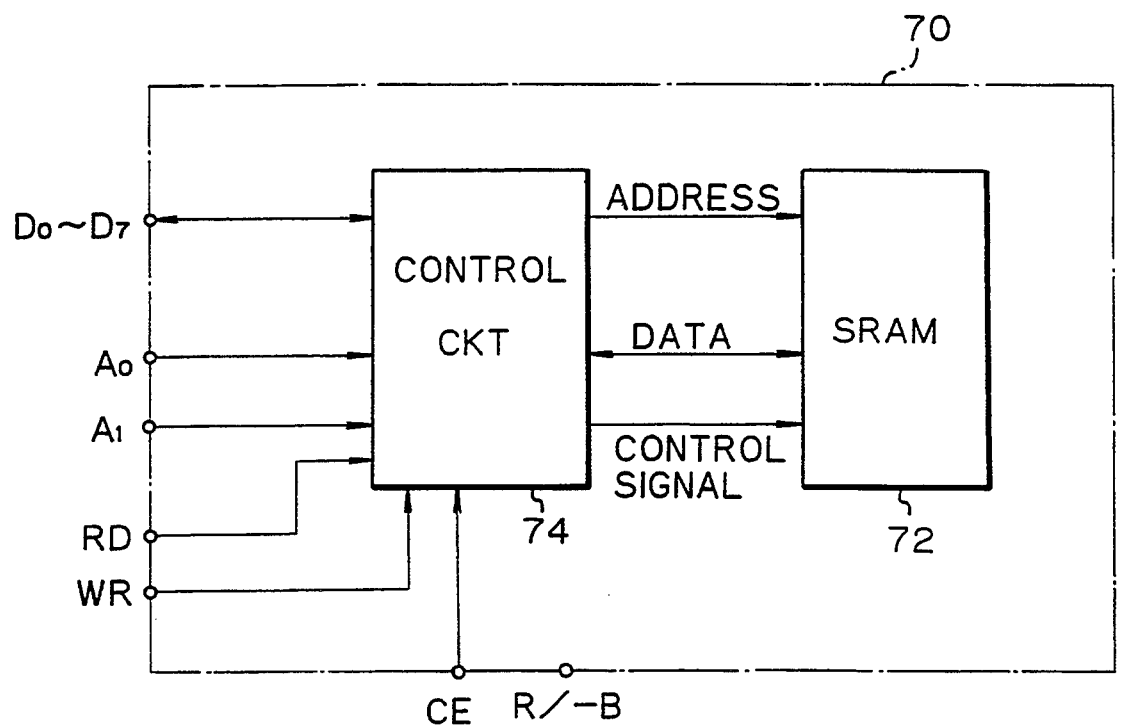
FIG. 2 is a schematic block diagram showing a specific construction of a conventional IC memory card implemented with an SRAM.

Referring to FIG. 2, a specific construction of an ordinary IC card with an SRAM will be described. As shown, the memory card, generally 70, has an SRAM 72 and a control circuit 74 which controls the write-in and read-out of data from the SRAM 72. An interface interfacing the memory card 70 and a host has 20-pin connection terminals, as defined in the JEIDA "IC Memory Card Guideline", Third Edition. These connection terminals are essentially the same in function as the terminals of the embodiment shown in FIG. 1, except that a terminal corresponding to the terminal R/−B is an idle terminal.

It will be seen that the IC memory card 10 shown in FIG. 1 has substantially the same interface as the SRAM type memory card 70 shown in FIG. 2 and writes data in substantially the same manner as the latter. Further, the memory cards 10 and 70 basically share the same reading principle. By contrast, a conventional EEPROM type memory card has, for example, 8-bit data input/output terminals in addition to 24-bit address input terminals. To write data, such a conventional memory card needs a complicated sequence of steps, i.e., inputting a write mode set-up command, inputting an address and data, inputting a verify mode set-up command, reading out one byte of data, and then verifying the data.

In summary, it will be seen that the embodiments of the present invention provide an IC memory card with an EEPROM which latches an address and data fed from a host in latches thereof in response to a clock also fed from the host and, thereafter, writes the data in the EEPROM chip by using a clock generated within the memory card. Therefore, the memory card for the embodiments of the present invention is compatible with an IC memory card implemented with an SRAM.

While the present invention has been described with reference to the particular illustrative embodiments, it is not to be restricted by the embodiments but only by the appended claims. It is to be appreciated that those skilled in the art can change or modify the embodiment without departing from the scope and spirit of the present invention.

What is claimed is:

1. An IC memory card removably connectable to a host, the IC memory card comprising:
   an EEPROM for storing data; and
   control means for controlling writing of the data transferred from the host into said EEPROM of the IC memory card, said control means including holding means for receiving and temporarily holding the data and an address representative of a particular storage location of said EEPROM designated for storage of the data transferred from the host,
   clock input means for receiving from the host a first clock which controls timing of said holding means holding the data, and
   clock generating means for generating a second clock which controls timing of writing the data from said holding means into said EEPROM.

2. The IC memory card in accordance with claim 1, wherein said control means further includes write control means responsive to the second clock for writing the data held by said holding means into the particular storage location of said EEPROM corresponding to the address.

3. The IC memory card in accordance with claim 1, wherein said holding means comprises a first and a second latch for holding the data and the address, respectively.

4. The IC memory card in accordance with claim wherein said clock generating means comprises an oscillator for generating a reference clock from which the second clock is produced.

5. The IC memory card in accordance with claim 4, wherein said clock generating means further comprises a clock pulse generating circuit for dividing a frequency of the reference clock to thereby generate the second clock.

6. An IC memory card including an EEPROM configured to operate as an SRAM memory card when removably connected to a host, the IC memory card comprising:
   holding means for receiving and temporarily holding input data and an address representative of a particular storage location of the EEPROM in which the input data transferred from the host are to be stored;
   clock input means for receiving from the host a first clock which causes said holding means to hold the input data; and
   clock generating means for generating a second clock for controlling timing of writing the input data from said holding means into the EEPROM.

7. The IC memory card in accordance with claim 6, further comprising write control means responsive to said second clock for writing the input data held by said holding means into the particular storage location of the EEPROM corresponding to the address.

8. The IC memory card in accordance with claim 6, wherein said holding means comprises first and second latches for holding the input data and the address, respectively.

9. The IC memory card in accordance with claim 6, wherein said clock generating means comprises an oscillator for generating a reference clock from which said second clock is produced and a clock pulse generating circuit for dividing a frequency of said reference clock to thereby generate said second clock.

10. A method of operating an IC memory card including an EEPROM as an SRAM memory card when removably connected to a host, comprising the steps of:
   (a) receiving from the host and temporarily holding input data and an address representative of a particular storage location of the EEPROM in holding means;
   (b) receiving from the host a first clock which causes said holding means to hold the input data; and (c) generating a second clock for controlling timing of writing of the input data held by said holding means into the particular storage location of the EEPROM corresponding to the address.

11. The method in accordance with claim 10, wherein said step (a) comprises holding the input data and the address in respective first and second latches of said holding means.

12. The method in accordance with claim 10, wherein said step (c) comprises the steps of generating a reference clock from which said second clock is produced and dividing a frequency of said reference clock to thereby generate said second clock.

* * * * *